(12) United States Patent
Petersen et al.

(10) Patent No.: US 9,707,843 B2
(45) Date of Patent: Jul. 18, 2017

(54) POWER TAKE-OFF, VEHICLE WITH SUCH A POWER TAKE-OFF AND AN INTERMEDIATE PIECE FOR SUCH A POWER TAKE-OFF

(71) Applicant: SCANIA CV AB, Södertälje (SE)

(72) Inventors: Daniel Petersen, Södertälje (SE); Johan Träff, Hölö (SE)

(73) Assignee: SCANIA CV AB (SE)

( * ) Notice: Subject to any disclaimer, the term of this patent is extended or adjusted under 35 U.S.C. 154(b) by 4 days.

(21) Appl. No.: 14/889,494

(22) PCT Filed: May 21, 2014

(86) PCT No.: PCT/SE2014/050625
§ 371 (c)(1),
(2) Date: Nov. 6, 2015

(87) PCT Pub. No.: WO2014/189456
PCT Pub. Date: Nov. 27, 2014

(65) Prior Publication Data
US 2016/0129786 A1    May 12, 2016

(30) Foreign Application Priority Data
May 21, 2013   (SE) ........................ 1350615

(51) Int. Cl.
*B60K 25/06*   (2006.01)
*B60K 17/28*   (2006.01)
(Continued)

(52) U.S. Cl.
CPC .............. *B60K 25/06* (2013.01); *B60K 17/28* (2013.01); *F16D 25/12* (2013.01); *B60K 2025/022* (2013.01); *B60Y 2300/423* (2013.01)

(58) Field of Classification Search
CPC .. B60K 25/06; B60K 17/28; B60K 2025/022; B60Y 2300/423
See application file for complete search history.

(56) References Cited

U.S. PATENT DOCUMENTS 2,162,979 A   6/1939   Simpson
2,210,998 A   8/1940   Baker et al.
(Continued)

FOREIGN PATENT DOCUMENTS

JP   H 08-318749       12/1996
WO   WO 2006/135122 A1   12/2006
WO   WO 2011/044376 A2   4/2011

OTHER PUBLICATIONS

Kida Kinsaku, Power Take-Out Device for Agricultural Machines, Dec. 3, 1996, JPO, JP 08-318749 A, Machine Translation of Description.*

(Continued)

*Primary Examiner* — James A English
(74) *Attorney, Agent, or Firm* — Ostrolenk Faber LLP

(57) ABSTRACT

A power take-off includes a housing (18) which at least partly accommodates an input shaft (20), at least one output shaft (22), a first transmission device (24) connected to the input shaft (20), a second transmission device (26) connected to the at least one output shaft (22), and at least one offtake module (30) connected to the at least one output shaft (22). The second transmission device (26) and the at least one output shaft (22) are arranged to fit in and be removable from the housing (18). Also, a vehicle (1) provided with such a power take-off (16) and to an intermediate piece (48) for such a power take-off (16).

17 Claims, 7 Drawing Sheets

(51) Int. Cl.
    *F16D 25/12*     (2006.01)
    *B60K 25/02*     (2006.01)

(56) References Cited

U.S. PATENT DOCUMENTS

| | | | |
|---|---|---|---|
| 2,506,671 A | | 5/1950 | Jacobi |
| 3,572,457 A | * | 3/1971 | Hill ..................... B62D 53/026 |
| | | | 180/235 |
| 4,542,801 A | | 9/1985 | Richards et al. |
| 5,041,062 A | | 8/1991 | Dornhoff |
| 5,383,374 A | | 1/1995 | Reynolds |
| 6,830,142 B2 | * | 12/2004 | Weilant ................. B60K 17/02 |
| | | | 180/247 |
| 2003/0188909 A1 | * | 10/2003 | Ohashi ............... A01D 34/6806 |
| | | | 180/300 |
| 2007/0209457 A1 | * | 9/2007 | Irikura ................. B60K 17/105 |
| | | | 74/15.8 |
| 2008/0169109 A1 | | 7/2008 | Buhrke et al. |

OTHER PUBLICATIONS

International Search Report dated Sep. 9, 2014 issued in corresponding International Patent Application No. PCT/SE2014/050625.

* cited by examiner

POWER TAKE-OFF, VEHICLE WITH SUCH A POWER TAKE-OFF AND AN INTERMEDIATE PIECE FOR SUCH A POWER TAKE-OFF

CROSS-REFERENCE TO RELATED APPLICATIONS

The present application is a 35 U.S.C. §§371 national phase conversion of PCT/SE2014/050625, filed May 21, 2014, which claims priority of Swedish Patent Application No. 1350615-9, filed May 21, 2013, the contents of which are incorporated by reference herein. The PCT International Application was published in the English language.

BACKGROUND TO THE INVENTION AND PRIOR ART

The present invention relates to a power take-off, a vehicle provided with such a power take-off, and an intermediate piece for such a power take-off.

Trucks are sometimes equipped with add-ons of various kinds, e.g. cranes and compressors. To drive the add-ons, power is extracted from the truck's powertrain by one or more power take-offs, commonly referred to as PTOs, which may be connected to and fitted on broadly all of the powertrain components, e.g. on the engine, on the gearbox or between the engine and the gearbox. Powering an add-on in the form of a crane with hydraulic cylinders entails using pressurized hydraulic oil and fitting in the power take-off an offtake module in the form of a hydraulic pump. If the add-on is a compressor, an offtake module is preferably fitted in the form of a connecting flange in the power take-off, and the compressor's input shaft is connected to the flange.

A power take-off may be single or double and be direct or geared. Direct power take-offs are driven directly by the vehicle's powertrain, and geared power take-off s are driven via a transmission to step up the rotation speed. Double power take-offs have a built-in transmission which distributes power to two outlets for connection of offtake modules.

Known power take-off s do however lack flexibility in their configurations. Where a single power take-off is to be replaced by a double power take-off, the whole unit has to be removed from the vehicle and changed. Where a direct power take-off is to be replaced by a geared power take-off, the whole unit likewise has to be changed. This leads to a large number and complex types of PTOs with many different types of configurations, and consequently greater costs. Changing the type of PTO, which may be necessary if the vehicle is to be used in a different area of application, e.g. upon change of owner, is also complex.

WO 2011/044376 A2 refers to a power take-off for a vehicle which has a surrounding housing with a transmission which transfers rotation and torque from the vehicle's gearbox to suitable equipment. The housing and transmission are constituted to prevent lubricant from leaking to the surroundings and contaminants from entering the housing.

U.S. Pat. No. 5,041,062 refers to a power take-off for a vehicle which has an input shaft driven by the vehicle's powertrain. The input shaft distributes torque and rotary motion to two output shafts via a chain transmission.

SUMMARY OF THE INVENTION

Despite known solutions in this field, there is a need to further develop a power take-off which has a high degree of flexibility so that various different types of add-ons on a vehicle may be driven by the power take-off There is also a need to further develop a power take-off which is of high efficiency with a view to reducing the vehicle's fuel consumption and also to reducing the heat generated in the power take-off.

The object of the present invention is therefore to propose a power take-off which has a high degree of flexibility.

Another object of the invention is to propose a power take-off which is of high efficiency.

A further object of the invention is to propose a power take-off which occupies little space.

The power take-off has a housing on which various offtake modules for different purposes may be fitted. This makes it possible for example for an add-on to the vehicle in the form of a crane with hydraulic cylinders to be powered by an offtake module in the form of a hydraulic pump which is connected to the power take-off. Even if an add-on in the form of a compressor is present on the same vehicle, an offtake module in the form of a connecting flange to which the compressor's input shaft is connected may be fitted in the same power take-off. Instead of changing the whole power take-off, if the vehicle is to be provided with new add-ons, further offtake modules of different types may be connected to the power take-off.

Transmission means with associated output shafts are removable so that transmission means pertaining to the outlets of the power take-off and which have no offtake module fitted may be removed to avoid powering components which at the time perform no function. This increases the efficiency of the power take-off and reduces heat generated by friction. The vehicle's fuel consumption may thus be reduced.

The housing is so configured that the second transmission means and the at least one output shaft, i.e. the output shaft connected to the second transmission means, can be fitted in/removed from the housing when the first transmission means is fitted in the housing. The fitting and removal of the second transmission means and the at least one output shaft in the housing are thus simplified in that an unnecessary number of components need not be fitted in and removed from the housing.

The housing is so configured that the second transmission means and the at least one output shaft, i.e. the output shaft connected to the second transmission means, can be fitted in/removed from the housing when the input shaft is connected to the powertrain. The fitting and removal of the second transmission means and the at least one output shaft in the housing are thus simplified in that the input shaft need not be disconnected from the powertrain.

The housing is so configured that the second transmission means and the at least one output shaft, i.e. the output shaft connected to the second transmission means, can be fitted in/removed from the housing when the housing is fitted on a vehicle. The fitting and removal of the second transmission means and the at least one output shaft in the housing are thus simplified in that the housing need not be removed from the vehicle.

In one embodiment the power take-off's outlets for connection of offtake modules face in different directions, which means that the offtake modules can be fitted in different directions. This further increases the power take-off's flexibility in that the offtake modules may be placed in a direction suited to the respective add-on's location on the vehicle. Connections between add-ons and the power take-off may thus be shorter and fewer in number.

In a further embodiment an intermediate piece which has a base portion with ducts and/or control valves is provided between a housing for the power take-off and the offtake modules. This intermediate piece makes it possible for compressed air or hydraulic oil to be conveyed to a controllable clutch unit provided for each offtake module. A valve unit provided for each offtake module and preferably situated in the base portion may be used to connect and disconnect respective offtake modules as desired. The offtake modules which at the time are not to drive any of the vehicle's add-ons may thus be disconnected, increasing the efficiency of the power take-off and reducing the heat generated by friction. The vehicle's fuel consumption may thus be reduced.

The intermediate piece also makes it possible to eliminate various hoses, pipes and connections for the connection and disconnection of the offtake modules, rendering the PTO more compact and reducing its weight and potentially leading to reduction in the vehicle's fuel consumption.

BRIEF DESCRIPTION OF THE DRAWINGS

Preferred embodiments of the invention are described below by examples with reference to the attached drawings, in which.

DETAILED DESCRIPTION OF PREFERRED EMBODIMENTS OF THE INVENTION

Figure 1:
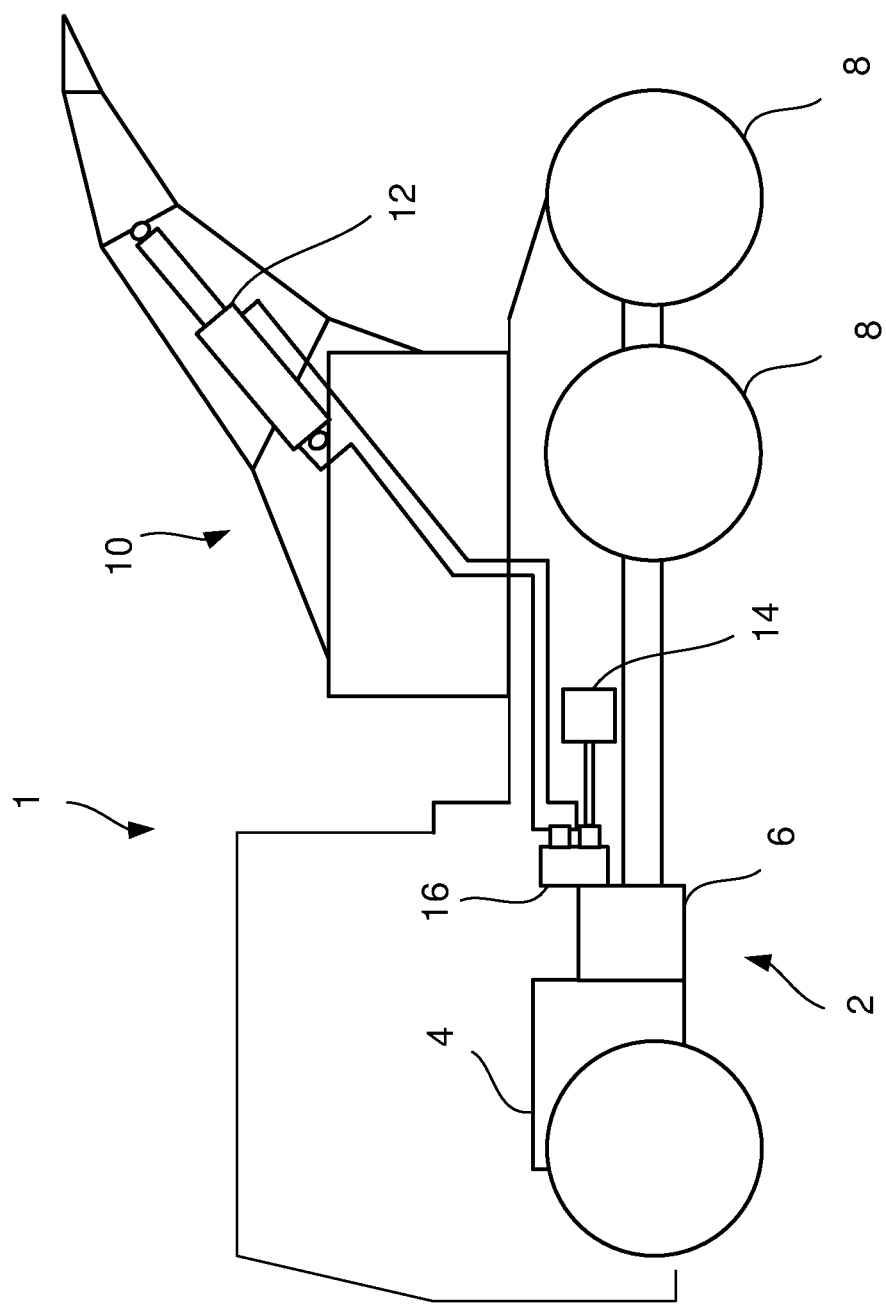
FIG. 1 depicts schematically a side view of a vehicle with a power take-off according to the present invention.

FIG. 1 depicts a schematic side view of a vehicle 1 which has a powertrain 2 with a combustion engine 4 connected to a gearbox 6. The gearbox is further connected to the vehicle's tractive wheels 8. The vehicle has a first add-on 10 in the form of a crane provided with a hydraulic cylinder 12. The vehicle has a second add-on 14 in the form of a compressor. To drive the crane and the compressor, the vehicle is provided with a power take-off 16 according to the present invention. The power means is connected to the hydraulic cylinder 12 via hydraulic lines and to the compressor via a driveshaft.

Figure 2:
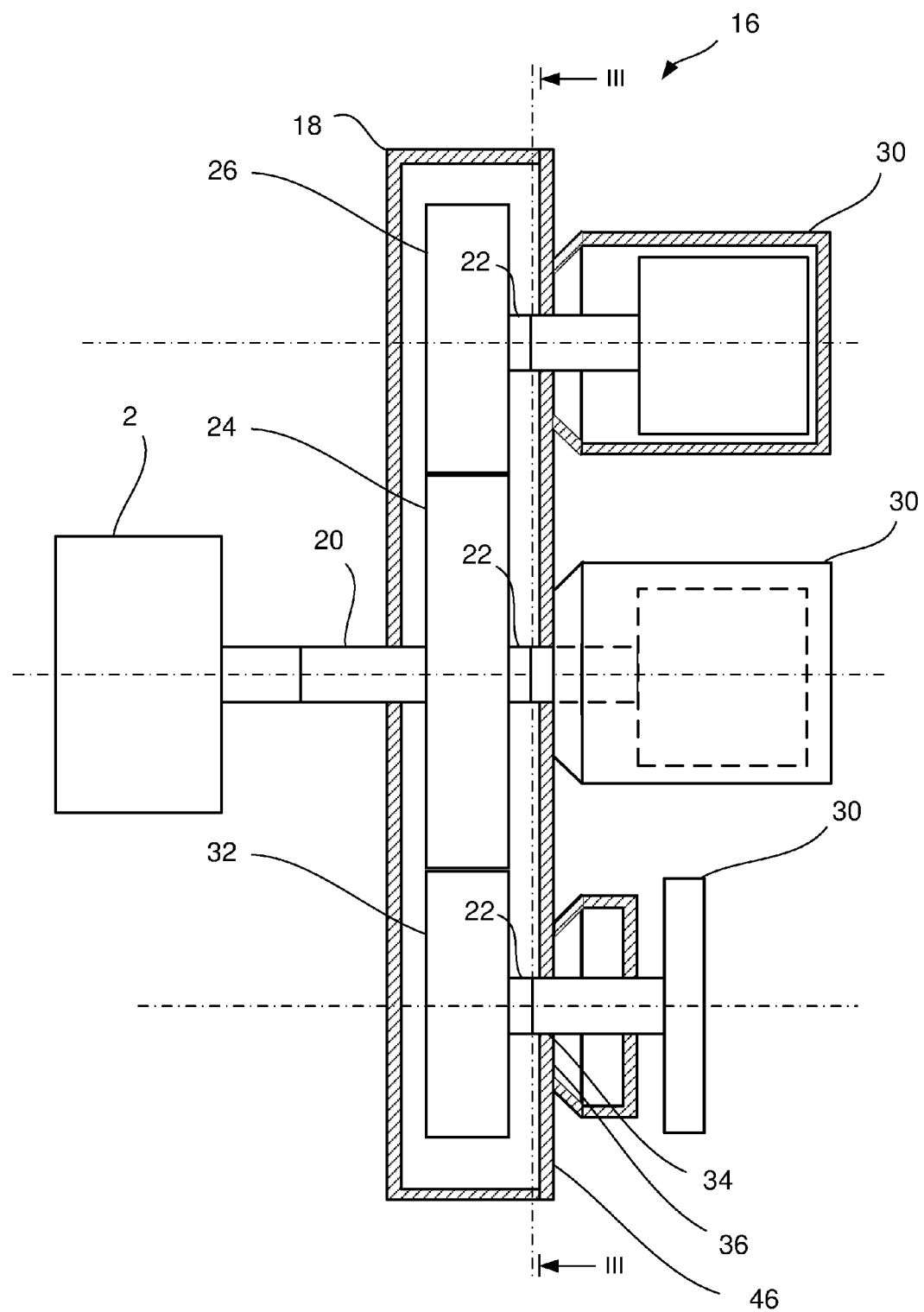
FIG. 2 depicts a schematic sectional view of a first embodiment of the power take-off according to the present invention.

FIG. 2 depicts a schematic sectional view of a first embodiment of a PTO 16 according to the present invention. The PTO has a housing 18 which at least partly accommodates an input shaft 20, at least one output shaft 22, a first transmission means 24 connected to the input shaft and a second transmission means 26 connected to the at least one output shaft. The PTO comprises also at least one offtake module 30 connected to the at least one output shaft. In the sectional view depicted in FIG. 2 a second transmission means 26 and a third transmission means 32 are driven by the first transmission means 24, and the transmission means take the form of first, second and third gearwheels 24, 26, 32. Other types of transmission means are nevertheless possible, e.g. chain drive. The gearwheels 24, 26, 32 are each provided with an output shaft 22 to which offtake modules 30 are connected. In FIG. 2 three offtake modules 30 are connected to the PTO 16 and to respective output shafts 22. The housing 18 is preferably filled with oil to lubricate the gearwheels 24, 26, 32 and the shafts 20, 22. The shafts 20, 22 are suitably journalled in the housing. The gearwheels 24, 26, 32 may have mutually different diameters and numbers of teeth suited to appropriate gearing, directions of rotation and distances between the input and output shafts 20, 22.

The input shaft 20 is intended to be connected to the vehicle's powertrain 2 so that the powertrain drives and causes rotation of the first gearwheel 24. When the first gearwheel rotates, the second and third gearwheels 26, 32 will also rotate, with the result that the offtake modules 30 connected to them are driven via respective output shafts 22. The offtake modules may be of the same or different types to meet different requirements. In FIG. 2 an offtake module 30 in the form of a hydraulic pump is connected to the output shaft of the second gearwheel 26, and an offtake module in the form of a connecting flange is connected to the output shaft of the third gearwheel 32. A hydraulic pump of the same type as that connected to the output shaft of the second gearwheel 26 is connected to the output shaft of the first gearwheel 24. The housing is provided with recesses 34 and connection surfaces 36 for the offtake modules 30, which recesses and connection surfaces are so configured that offtake modules of any type may be connected to the output shafts of the gearwheels 24, 26, 32. The connection surfaces may be provided with undepicted seals and fastening elements for the offtake modules. When for example an add-on 10 in the form of a crane with hydraulic cylinders 12 is fitted on the vehicle, an offtake module in the form of a hydraulic pump is fitted in the PTO 16 to power the crane's hydraulic cylinders. If the add-on 14 is for example a compressor, an offtake module in the form of a connecting flange is preferably fitted in the PTO, and the compressor's input shaft is connected to said flange.

Figure 3:
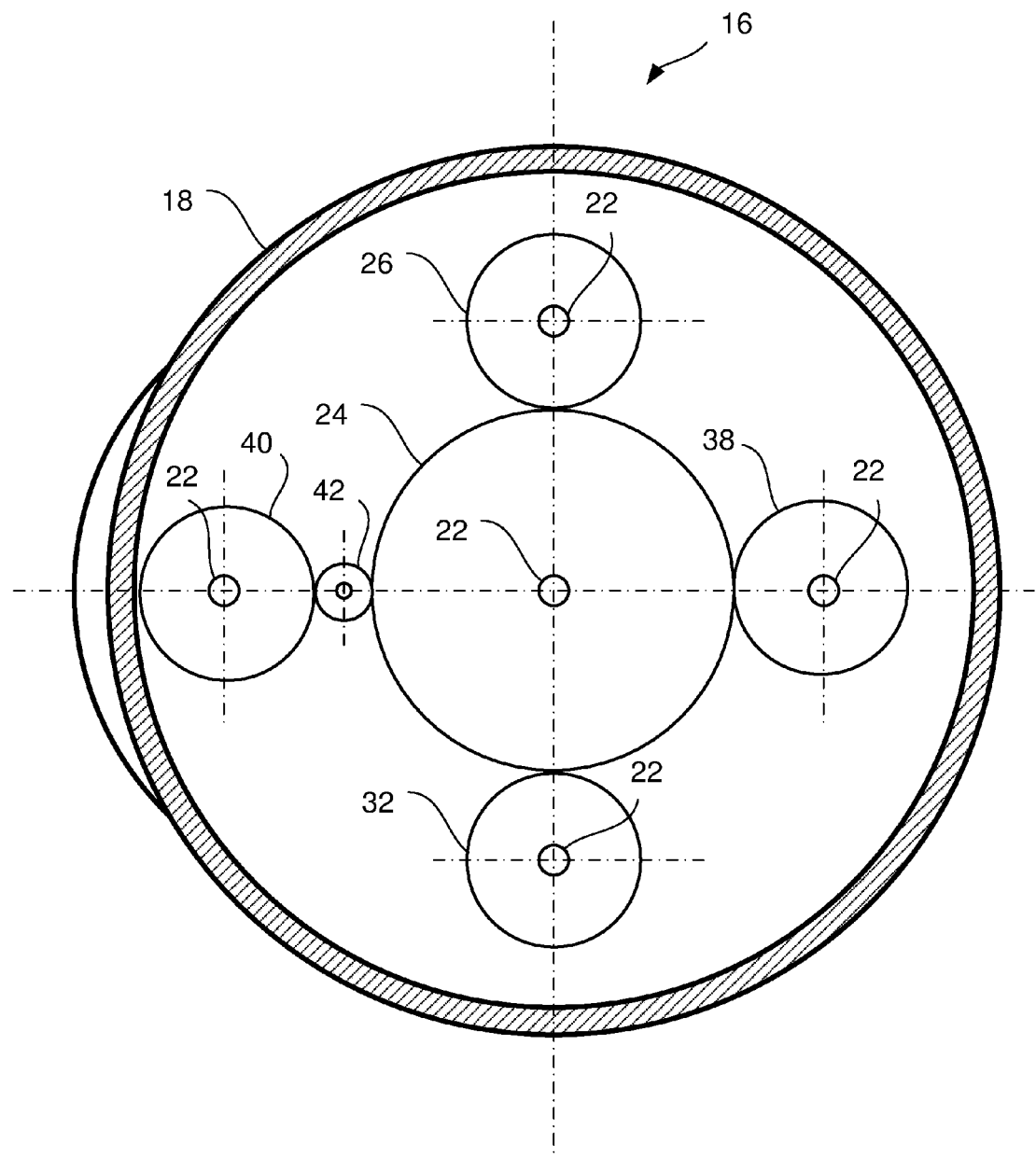
FIG. 3 depicts a sectional view of the power take-off along the line III-III in FIG. 2.

FIG. 3 depicts a sectional view of the PTO 16 along the line III-III in FIG. 2. It also depicts fourth and fifth transmission means in the form of fourth and fifth gearwheels 38, 40 situated in the PTO's housing 18. The fifth gearwheel 40 is driven by the first gearwheel 24 via an intermediate gearwheel 42, with the result that the direction of rotation of the fifth gearwheel will be opposite to that of the second, third and fourth gearwheels 26, 32, 38. The between-centres distance between the first and fourth gearwheels 24, 40 will also increase. In the embodiment in FIG. 3 the PTO may be provided with five offtake modules 30 but it is also possible for it to be provided with more gearwheels around the first gearwheel 24 so that it may have more than five offtake modules.

Figure 4:
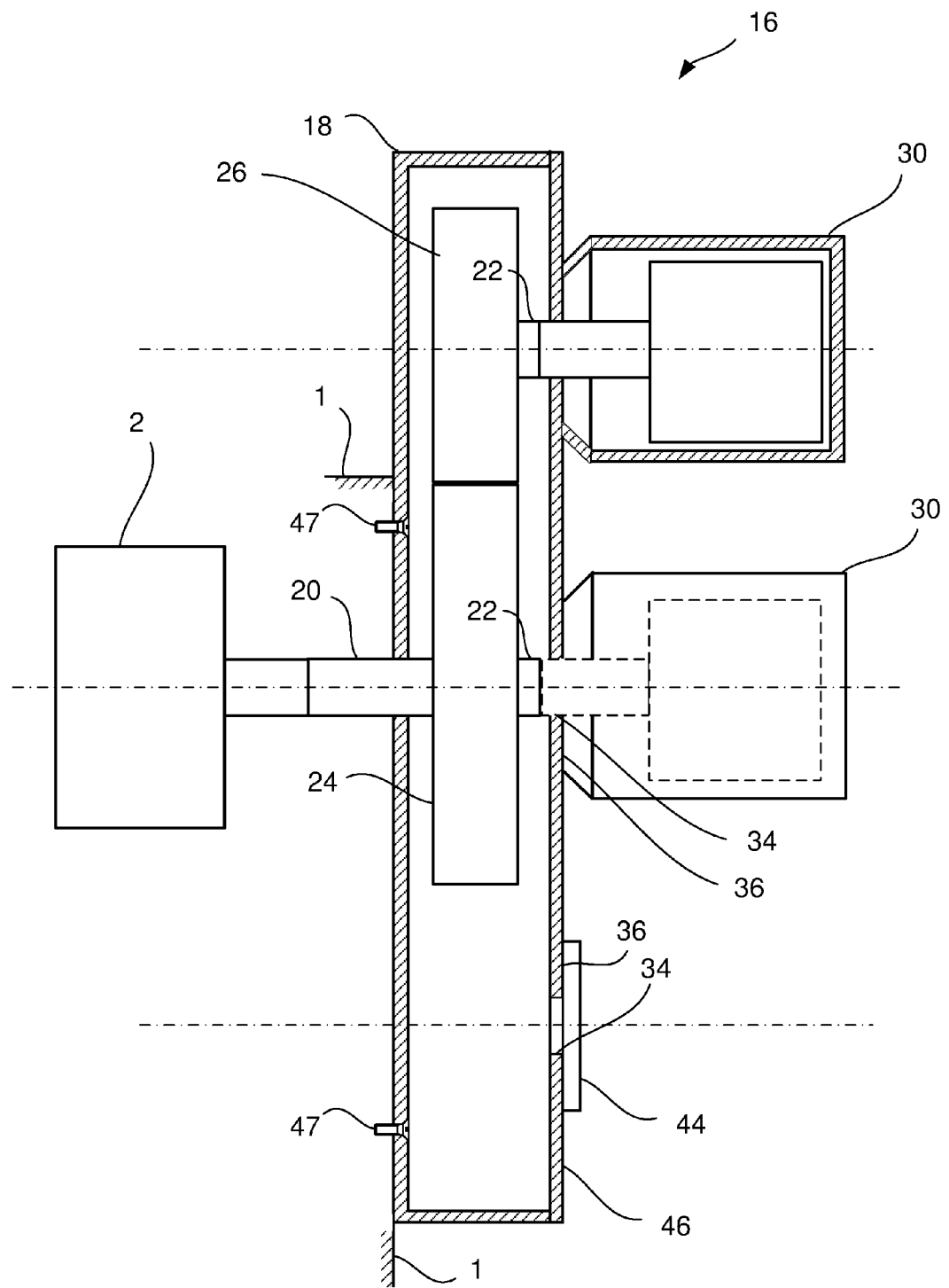
FIG. 4 depicts a schematic sectional view of the first embodiment of the power take-off according to the present invention with one offtake module removed.

FIG. 4 depicts a schematic sectional view of the first embodiment of the PTO 16 according to the present invention with one offtake module 30 removed. In cases where only two offtake modules are required to drive the add-ons 10, 14 with which the vehicle is fitted, the recesses 34 at the respective connection surfaces 36 of the housing 18 which are intended for further offtake modules may be blocked by a masking plate 44 to prevent oil from leaving, and dirt from entering, the housing. The gearwheels 26, 32, 38, 40 which are not connected to an offtake module via respective output shafts 22 may also be removed from the housing to avoid powering components which at the time perform no function. This increases the efficiency of the PTO and reduces the heat generated by friction. The vehicle's fuel consumption may thus be reduced. The removals may be effected by first removing a cover 46 from the housing and then removing the gearwheels 26, 32, 38, 40 with associated output shafts 22 to which no offtake modules are to be connected. Thereafter the cover 46 is fitted on the housing and the offtake modules which are to be used are fitted in the recesses 34 at the respective connection surfaces 36. The recesses and connection surfaces to which no offtake modules are to be connected are each provided with a masking plate.

Where further offtake modules are to be fitted to the PTO, the cover 46 and the masking plate 44 which block the recesses and connection surfaces to which offtake modules are to be fitted are removed. This is followed by fitting in the housing the gearwheels 26, 32, 38, 40 with associated output shafts 22 which are to be connected to offtake modules. The final step is to fit the cover 46 on the housing. The first gearwheel 24 thus need not be removed when the gearwheels 26, 32, 38, 40 with associated output shafts are to be fitted in or removed from the housing. Fitting and removing the gearwheels 26, 32, 38, 40 with associated output shafts is thus simplified in that an unnecessary number of components need not be fitted in and removed from the housing. Nor need the input shaft 20 be removed from the powertrain 2 when the gearwheels 26, 32, 38, 40 with associated output shafts are to be fitted in or removed from the housing, thereby also simplifying the fitting/removal of the gearwheels 26, 32, 38, 40 with associated output shafts in/from the housing.

With advantage, the housing is so configured that the gearwheels 26, 32, 38, 40 with associated output shafts can be fitted in and removed from the housing when the housing is fitted on the vehicle. The fitting/removal of the gearwheels 26, 32, 38, 40 with associated output shafts in/from the housing is thus simplified in that the housing need not be removed from the vehicle. The housing may be connected to the vehicle by suitable fastening elements 47.

Figure 5:
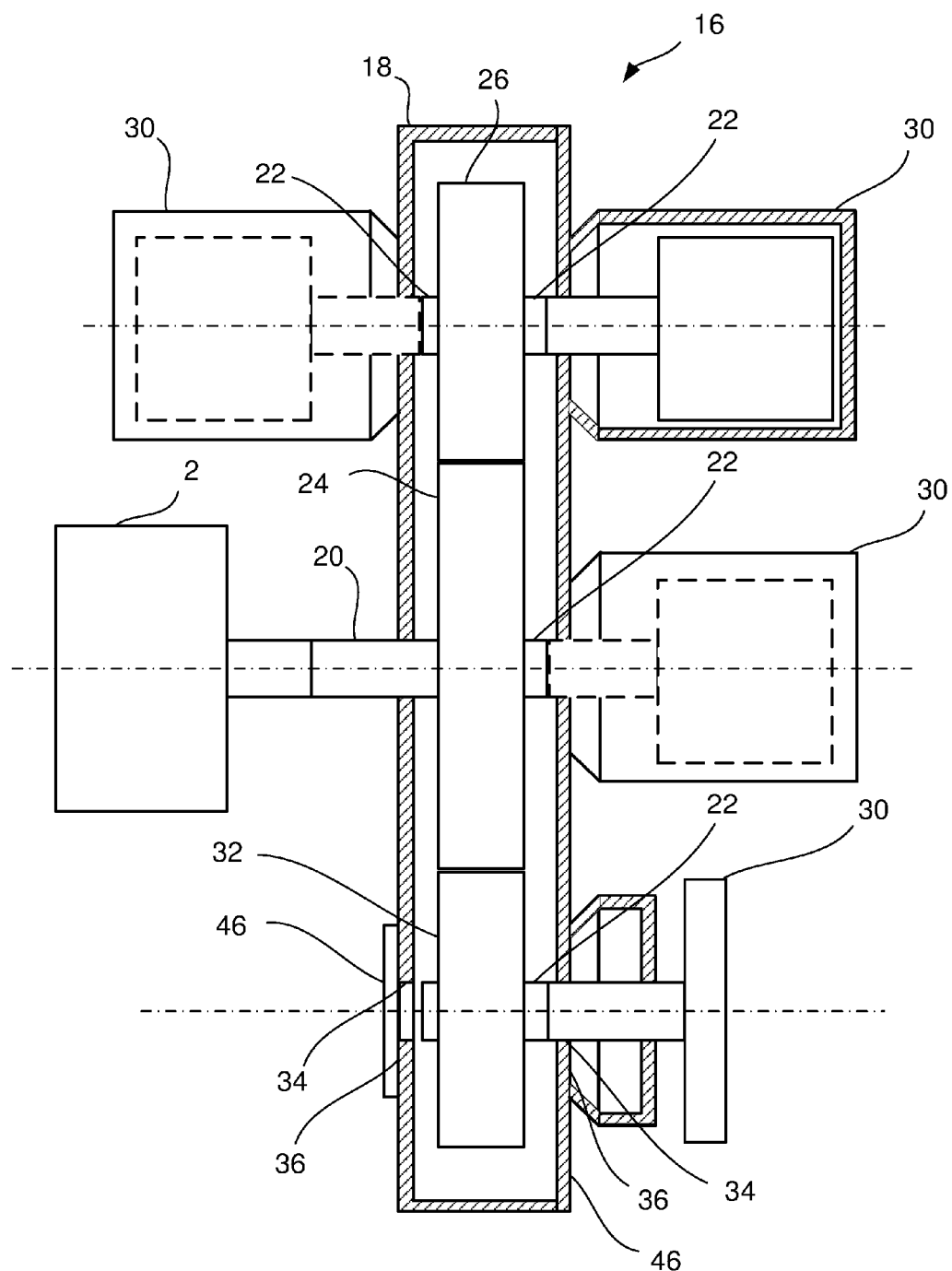
FIG. 5 depicts a schematic sectional view of the power take-off in a second embodiment.

FIG. 5 depicts a schematic sectional view of the PTO 16 in a second embodiment which differs from the first in that its recesses 34 for connection of offtake modules 30 face in different directions, making it possible for offtake modules to be fitted in different directions. Thus the second and third gearwheels 26, 32, and also the fourth and fifth gearwheels 38, 40, are so configured that the output shaft 22 of each of the gearwheels 26, 32, 38, 40 may be connected to two offtake modules in opposite directions. This further increases the PTO's flexibility in that the offtake modules may be placed in the direction appropriate to the location of the add-ons 10, 14 on the vehicle. This makes it possible for connections between the add-ons and the PTO to be shorter and fewer in number.

Figure 6:
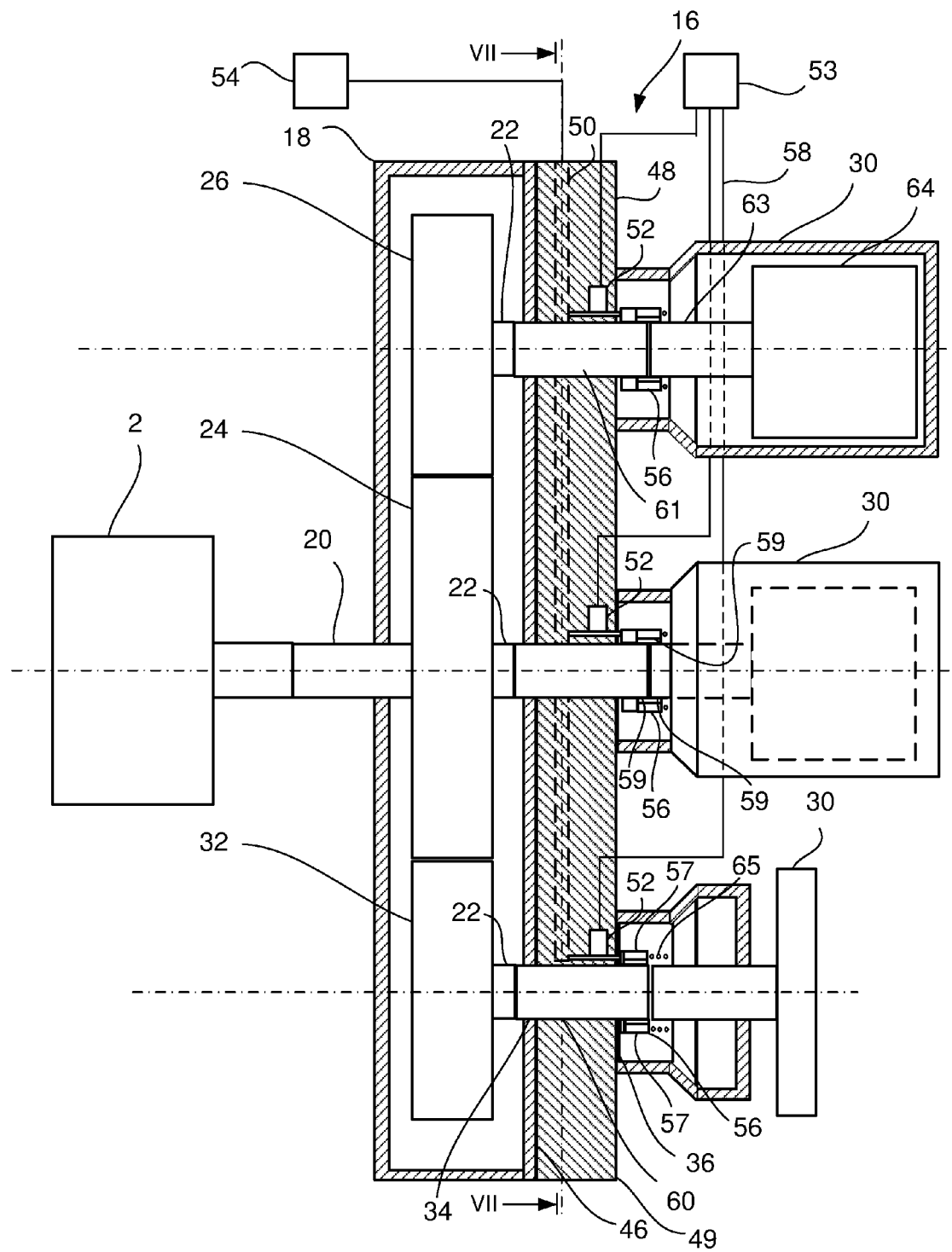
FIG. 6 depicts a schematic sectional view of the power take-off in a third embodiment.

FIG. 6 depicts a schematic sectional view of the PTO 16 in a third embodiment which differs from the above embodiments in that an intermediate piece 48 which has a base portion 49 with ducts 50 and control valves 52 is provided between the housing 18 and the offtake modules 30. This intermediate piece makes it possible for pressurised fluid, e.g. air or hydraulic oil from a pressure source 54, to be conveyed to a controllable clutch unit which is provided for each offtake module. The ducts 50 in the base portion 49 are configured to convey the fluid to the respective clutch units 56 in order to direct them to a disconnected or connected position. A control valve 52 is preferably provided for each offtake module and is preferably situated in the base portion 49. These control valves may be used to connect and disconnect the respective offtake modules as desired. The control valves are operated by means of a control unit 53 which is connected to them via respective signal lines 58. The offtake modules which at the time are not to drive any of the vehicle's add-ons 10, 14 may thus be disconnected, increasing the efficiency of the PTO and reducing the heat generated by friction. The vehicle's fuel consumption may thus be reduced. As an alternative, the controllable clutch unit 56 might be situated between the output shaft 22 and the offtake module 30 without an intermediate piece 48. The intermediate piece 48 does however make it possible to eliminate various hoses, pipes and connections for the connection and disconnection of the offtake modules, rendering the PTO more compact and reducing its weight, potentially leading to reduction in the vehicle's fuel consumption.

The controllable clutch unit 56 has an axially movable sleeve 57 which is moved by the fluid in the ducts 50. The inside of the sleeve is provided with splines 59 which cooperate both with corresponding splines 59 on a first shaft journal 61 of the offtake module 30 which is connected to the output shaft 22, and with splines 59 on a second shaft journal 63 which is connected to a rotatable component 64 of the offtake module. When the control valve 52 receives a signal from the control unit 53 to open the duct 50, the fluid will move the sleeve 57 axially to a position which allows engagement with the splines 59 on both the first and second shaft journals. The output shaft 22 will thus drive the connected offtake module 30. Closing the control valve 52 will cause the fluid pressure acting upon the sleeve 57 to decrease, resulting in the sleeve moving axially along the shaft journals 61, 63 and creating a clearance between them. The second shaft journal 63 will thus be disconnected from the first shaft journal 61, bringing the offtake module's rotatable component 64 to a standstill and thus inactivating the offtake module. The movement of the sleeve 57 upon closure of the control valve 52 is effected by a spring element 65. It is possible for the clutch unit 56 to be configured differently, e.g. as a friction clutch.

The intermediate piece 48 is so configured that the offtake modules 30 can be placed in apertures 60 with associated connection surfaces 36 of the base portion 49. In the same way as the recesses 34 and connection surfaces 36 of the housing 18 in the other embodiments, those of the base portion 49 are so configured that offtake modules of any type may be connected to the output shafts 22 of the gearwheels 24, 26, 32, 38, 40. The connection surfaces 36 may be provided with undepicted seals and fastening elements for the offtake modules. In FIG. 6 an intermediate piece 48 is provided on one side of the housing, but it is possible to have a further intermediate piece 48 on the opposite side of the housing so that the housing might accommodate further offtake modules.

Figure 7:
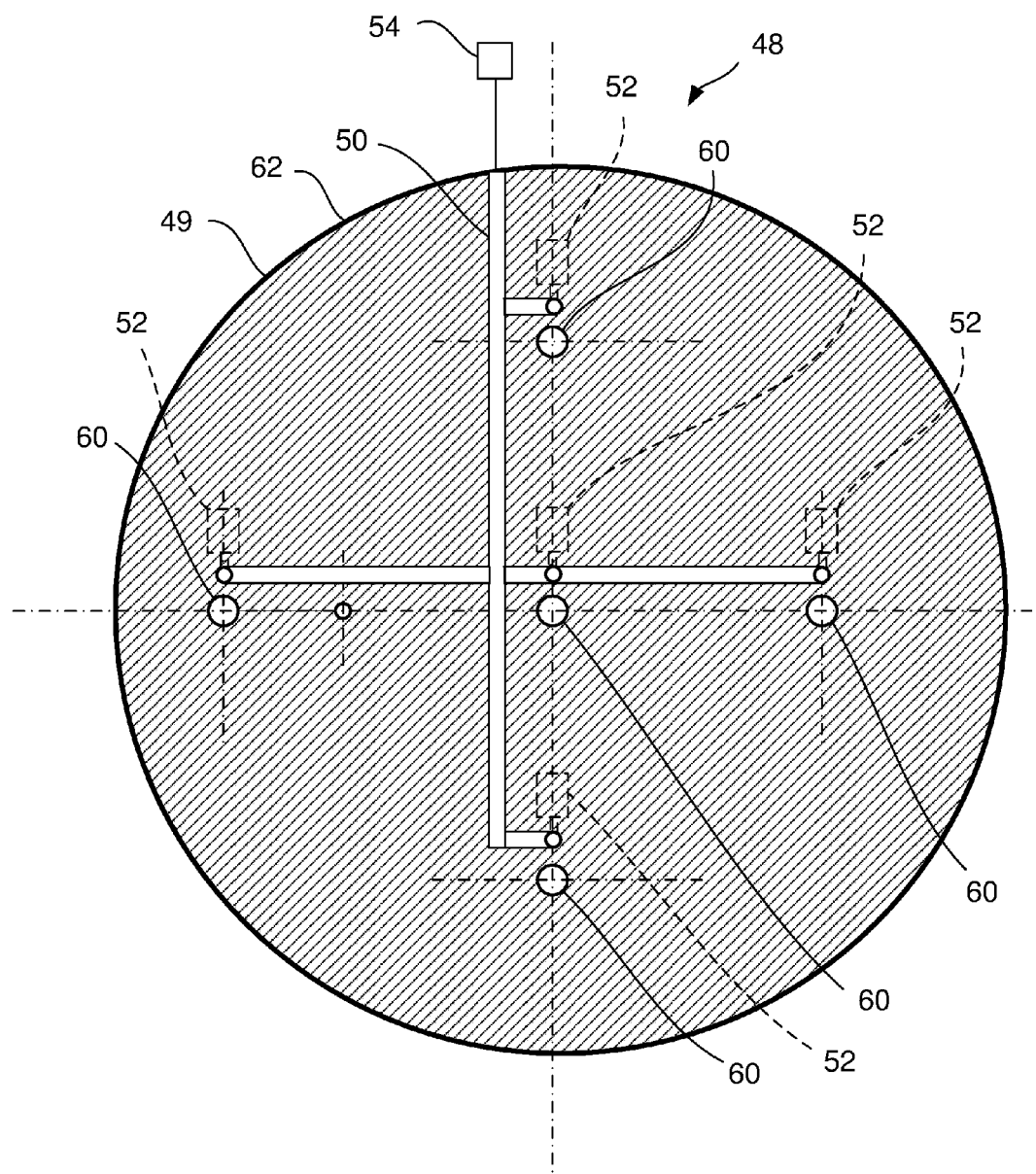
FIG. 7 depicts a sectional view of the power take-off along the line VII-VII in FIG. 6.

FIG. 7 depicts a sectional view of the intermediate piece 48 along the line VII-VII in FIG. 6. It shows the ducts 50 extending and branching in the intermediate piece's base portion 49. The ducts extend from an outer surface 62 of the base portion where the pressure source 54 is connected. They extend from the outer surface 62 to each point where an offtake module 30 may be connected and a control valve 52 is situated. The drawing shows five possible connection points for offtake modules but it is also possible to connect more or fewer offtake modules to the PTO.

Cited components and features cited above may within the scope of the invention be combined between different versions cited.

The invention claimed is:

1. A power take-off system comprising:
   a housing having a removable cover;
   an input shaft, the housing being configured to at least partly accommodate the input shaft;
   at least two output shafts extending outward of the housing each through a respective recess defined in the removable cover;
   a first rotation transmission connected to the input shaft for driving the input shaft;
   a second rotation transmission connected to at least one of the output shafts for being driven by the at least one of the output shafts;
   a third rotation transmission connected to at least another of the output shafts for being driven by the at least another one of the output shafts;
   at least two offtake modules respectively connected to two of the output shafts; and
   a masking plate;
   wherein the second rotation transmission and the at least one output shaft which is connected to the second rotation transmission are both configured and arranged to be fittable in and removable from the housing, and
   wherein the masking plate is configured to cover the recess in the removable plate through which the at least one output shaft extends when the at least one output shaft is removed from the housing.

2. A power take-off system according to claim 1, further comprising:
   the first rotation transmission is fitted in the housing;
   the housing is configured so that the second rotation transmission and the at least one output shaft connected to the second rotation transmission are fittable in and removable from the housing when the first rotation transmission is also fitted in the housing.

3. In combination, a powertrain from an engine and a power take-off according to claim 2, the combination comprising:
   the powertrain is connected to the input shaft for the powertrain to drive the input shaft; and
   the housing is configured so that the second rotation transmission and the at least one output shaft connected to the second rotation transmission are fittable in and removable from the housing when the input shaft is connected to the powertrain.

4. The power take-off system according to claim 2, further comprising:
   the housing is configured so that the second rotation transmission and the at least one output shaft are connected to the second rotation transmission are fittable in and removable from the housing when the housing is fitted on a vehicle.

5. In combination, a powertrain from an engine and a power take-off system according to claim 1 the combination comprising:
   the powertrain is connected to the input shaft for the powertrain to drive the input shaft; and
   the housing is configured so that the second rotation transmission and the at least one output shaft connected to the second rotation transmission are removed from the housing when the input shaft is connected to the powertrain and the masking plate covers the recess through which the at least one output shaft extended prior to removal.

6. A power take-off system according to claim 1, further comprising:
   the housing is configured so that the second rotation transmission and the at least one output shaft connected to the second rotation transmission are fittable in and removable from the housing when the housing is fitted on a vehicle.

7. A power take-off system according to claim 1, further comprising:
   two of the offtake modules;
   the second rotation transmission is configured so that the at least one output shaft connected to the second rotation transmission is configured to be connected to two of the offtake modules.

8. A power take-off system according to claim 1, further comprising:
   the second rotation transmission is configured so that two of the offtake modules can be connected to the at least one output shaft which is connected to the second rotation transmission, and the second rotation transmission extends in two opposite directions out of the housing each for connection respectively to the two of the offtake modules.

9. A power take-off system according to claim 1, further comprising:
   a controllable clutch unit between the at least one output shaft which is connected to the second rotation transmission and the at least one offtake module which is connected to the at least one output shaft.

10. A power take-off system according to claim 1, wherein the first, second and third rotation transmissions are respectively gearwheels.

11. The power take-off system according to claim 10, wherein the gearwheel of the first rotation transmission meshes with the gearwheel of the second and the third rotation transmissions for the first rotation transmission driving rotation of the second and third rotation transmissions.

12. A power take-off system according to claim 1, wherein the at least one offtake module comprises a hydraulic pump or a connecting flange.

13. A vehicle including a power take-off system according to claim 1.

14. A power take-off comprising:
   an input shaft and a housing configured to at least partly accommodate the input shaft;
   at least two output shafts extending outward of the housing;
   a first rotation transmission connected to the input shaft for driving the input shaft,
   a second rotation transmission connected to at least one of the output shafts for being driven by the at least one of the output shafts;
   a third rotation transmission connected to at least another of the output shafts for being driven by the at least another one of the output shafts;
   at least two offtake modules respectively connected to two of the output shafts; and
   the second rotation transmission and the at least one output shaft which is connected to the second rotation transmission are both configured and arranged to be fittable in and removable from the housing;
   a controllable clutch unit between the at least one output shaft which is connected to the second rotation transmission and the at least one offtake module which is connected to the at least one output shaft, and
   an intermediate piece between the housing and the clutch unit, the intermediate piece comprises a base portion provided with ducts configured for conveying fluid to the clutch unit and controllable for directing the clutch unit to one of disconnected or connected positions of the clutch unit.

15. A power take-off according to claim 14, further comprising:
at least one control valve in the base portion of the intermediate piece and configured and operable to direct the fluid to the clutch unit.

16. A power take-off comprising:
an input shaft and a housing configured to at least partly accommodate the input shaft,
at least two output shafts extending outward of the housing;
a first rotation transmission connected to the input shaft for driving the input shaft;
a second rotation transmission connected to at least one of the output shafts for being driven by the at least one of the output shafts;
a third rotation transmission connected to at least another of the output shafts for being driven by the at least another one of the output shafts;
at least two offtake modules respectively connected to two of the output shafts; and
the second rotation transmission and the at least one output shaft which is connected to the second rotation transmission are both configured and arranged to be fittable in and removable from the housing;
a controllable clutch unit between the at least one output shaft which is connected to the second rotation transmission and the at least one offtake module which is connected to the at least one output shaft; and
an intermediate piece comprising a base portion provided with ducts configured for conveying fluid to the clutch unit at the intermediate piece and the ducts are controllable for directing the clutch unit to one of a disconnected position or a connected position of the clutch unit.

17. An intermediate piece according to claim 16, further comprising:
at least one control valve in the base portion and configured and operable to direct the fluid to the clutch unit.

* * * * *